(12) United States Patent
Fendt

(10) Patent No.: US 9,971,025 B2
(45) Date of Patent: May 15, 2018

(54) METHOD FOR DETERMINING THE DISTANCE OF AN OBJECT BY MEANS OF A POLARIZATION-MODULATED TRANSMISSION LIGHT BEAM

(71) Applicant: Conti Temic microelectronic GmbH, Nuremberg (DE)

(72) Inventor: Guenter Anton Fendt, Schrobenhausen (DE)

(73) Assignee: Conti Temic microelectronic GmbH, Nuernberg (DE)

(*) Notice: Subject to any disclaimer, the term of this patent is extended or adjusted under 35 U.S.C. 154(b) by 261 days.

(21) Appl. No.: 14/904,492

(22) PCT Filed: Jul. 28, 2014

(86) PCT No.: PCT/DE2014/200358
§ 371 (c)(1),
(2) Date: Jan. 12, 2016

(87) PCT Pub. No.: WO2015/043584
PCT Pub. Date: Apr. 2, 2015

(65) Prior Publication Data
US 2016/0187471 A1 Jun. 30, 2016

(30) Foreign Application Priority Data
Sep. 26, 2013 (DE) .................. 10 2013 219 344

(51) Int. Cl.
*G01C 3/08* (2006.01)
*G01S 7/499* (2006.01)
(Continued)

(52) U.S. Cl.
CPC ............ *G01S 7/499* (2013.01); *G01S 7/484* (2013.01); *G01S 7/4815* (2013.01); *G01S 17/10* (2013.01)

(58) Field of Classification Search
CPC ........ G01S 17/10; G01S 7/484; G01S 7/4815; G01S 7/499
(Continued)

(56) References Cited

U.S. PATENT DOCUMENTS

| 7,495,748 | B1* | 2/2009 | Sandusky | ................ G01C 3/08 356/5.1 |
| 2010/0037602 | A1* | 2/2010 | Kimura | ................ F04B 49/125 60/395 |
| 2011/0267671 | A1* | 11/2011 | Peng | ........................ H01S 3/005 359/257 |

FOREIGN PATENT DOCUMENTS

| DE | 43 24 308 | 12/1994 |
| DE | 44 39 298 | 6/1996 |

(Continued)

OTHER PUBLICATIONS

International Search Report of the International Searching Authority for International Application PCT/DE2014/200358, dated Oct. 29, 2014, 2 pages, European Patent Office, HV Rijswijk, Netherlands.
(Continued)

*Primary Examiner* — Mark Hellner
(74) *Attorney, Agent, or Firm* — W. F. Fasse

(57) ABSTRACT

In a method of determining the distance of an object (10), a polarization-modulated transmission light beam (LS) is reflected at the object (10) and is received as a reception light beam (LE) by a polarization analyzer, and the output signal thereof is fed to an evaluation unit (A) for determining the distance. The polarization-modulated transmission light beam (LS) is generated by at least two light sources (D1, D2, D3) which emit differently polarized light beams (L1, L2, L3), wherein the light sources (D1, D2, D3) are each respectively operated with a distinct defined mark-space pattern (M1, M2, M3, M4, M5, M6). The polarization analyzer has polarization filters (P1, P2, P3) corresponding
(Continued)

at least to the number of light sources. The respective polarization plane of each one of the polarization filters is correspondingly adapted to a respective polarization plane (E1, E2, E3) of the light beams (L1, L2, L3).

18 Claims, 2 Drawing Sheets

(51) Int. Cl.
    *G01S 17/10*     (2006.01)
    *G01S 7/481*     (2006.01)
    *G01S 7/484*     (2006.01)

(58) Field of Classification Search
    USPC .......................................................... 356/5.01
    See application file for complete search history.

(56) References Cited

FOREIGN PATENT DOCUMENTS

| EP | 0 911 645 | 4/1999 |
|---|---|---|
| EP | 0 977 027 | 2/2000 |
| EP | 1 628 141 | 2/2006 |
| EP | 2 159 603 | 3/2010 |

OTHER PUBLICATIONS

PCT International Preliminary Report on Patentability including English Translation of PCT Written Opinion of the International Searching Authority for International Application PCT/DE2014/200358, dated Mar. 29, 2016, 11 pages, International Bureau of WIPO, Geneva, Switzerland.

German Search Report for German Patent Application No. 10 2013 219 344.0, dated Feb. 11, 2014, 5 pages, Muenchen, Germany, with English translation, 5 pages.

* cited by examiner

METHOD FOR DETERMINING THE DISTANCE OF AN OBJECT BY MEANS OF A POLARIZATION-MODULATED TRANSMISSION LIGHT BEAM

FIELD OF THE INVENTION

The invention relates to methods for determining the distance of an object by means of a polarization-modulated transmission light beam.

BACKGROUND INFORMATION

Increasingly, today's vehicles are equipped with assistance and safety systems, such as e.g. navigation systems, ACC-systems (Adaptive Cruise Control), lane assistance systems, traffic sign recognition, etc. The function of many of these systems requires the determination of a distance to an object in the environment of the vehicle, for example of a preceding vehicle. Here, known methods such as ultrasonic, infrared, laser, radar, lidar, etc. are applied, wherein usually a coded signal is transmitted and the distance to the object is calculated on the basis of the running time of the reflected signal.

A generic method is described in EP 0 911 645 B1, wherein by means of an optical apparatus the distance and/or speed of an object are measured by means of a polarization-modulated transmission light beam. This optical apparatus comprises a laser diode for generating a longitudinal-polarized transmission light beam, the polarization plane thereof changing by means of a polarization modulator between a first polarization state and a second polarization state in accordance with a binary control signal. The transmission light beam backscattered at the object as reception light beam is converted by a polarization detector into an amplitude-modulated light beam, to generate therefrom by means of a detector an electrical signal, which is compared with the binary control signal controlling the polarization modulator. From the phase shift between these two signals the distance and/or the speed of the object are determined.

SUMMARY OF THE INVENTION

Starting from this state of the art, it is the object of the invention to provide a further method of the aforementioned type, which can be realized particularly simply and cost-effectively.

Such a method for determining the distance of an object by means of a polarization-modulated transmission light beam, wherein the transmission light beam reflected at the object is received as reception light beam by a polarization analyzer and the output signal thereof is fed to an evaluation unit for determining the distance, is characterized according to the invention in that the polarization-modulated transmission light beam is generated by means of at least two light sources which emit differently polarized light beams, wherein the light sources are operated in each case with a defined mark-space pattern, and the polarization analyzer is embodied with polarization filters corresponding at least to the number of light sources, the polarization plane of said polarization filters being correspondingly adapted in each case to a polarization plane of the light beams.

In a surprising and simple manner with this method according to the invention the polarization-modulated transmission light beam is generated by means of at least two light beams, which are differently polarized and which are operated in each case with a defined mark-space pattern. By the superimposition of these two differently polarized and pulsed light beams the transmission light beam is generated, which is reflected at an object whose distance is to be measured, and is received as reception light beam by the polarization analyzer.

The most significant advantage of such a method is that the light performance of the polarization-modulated transmission light beam can be kept constant at a high level and that thus a higher signal-to-noise ratio can be achieved.

According to a preferred embodiment of the invention, the light sources are operated with disjunctively phase-shifted mark-space patterns. Thereby, the transmission light beam comprises only the polarization planes generated by the respective light sources.

Furthermore, according to another embodiment of the invention, it is possible that at least two light sources are operated with non-disjunctively phase-shifted mark-space patterns. This results in that the transmission light beam in addition to the polarization planes of the light sources comprises also the polarization plane resulting from the superimposition of the polarization planes of these two light sources.

For the pulsed control of the light sources according to a further development a PWM-pattern or a-PPM-pattern can be used as a mark-space pattern. A PWM-pattern leads to a pulse-width modulation of the light sources, a PPM-pattern to a pulse-pause modulation.

Furthermore, for the polarization of the light sources different polarization modes are available. Thus, according to a further development the light beams of the light sources can be linearly, circularly or elliptically polarized.

According to an advantageous embodiment two light sources are used, whose light beams are linearly polarized and the polarization planes are at an angle of 90° to each other. Thus, the method according to the invention can be realized with a low constructive effort.

Moreover, according to a further development it is also possible to use three light sources with linearly polarized light beams, whose polarization planes are at an angle of 120° to each other

BRIEF DESCRIPTION OF THE DRAWINGS

In the following, the invention will be explained in more detail with reference to the accompanying drawings, in which.

DETAILED DESCRIPTION OF EXAMPLE EMBODIMENTS OF THE INVENTION

Figure 1:
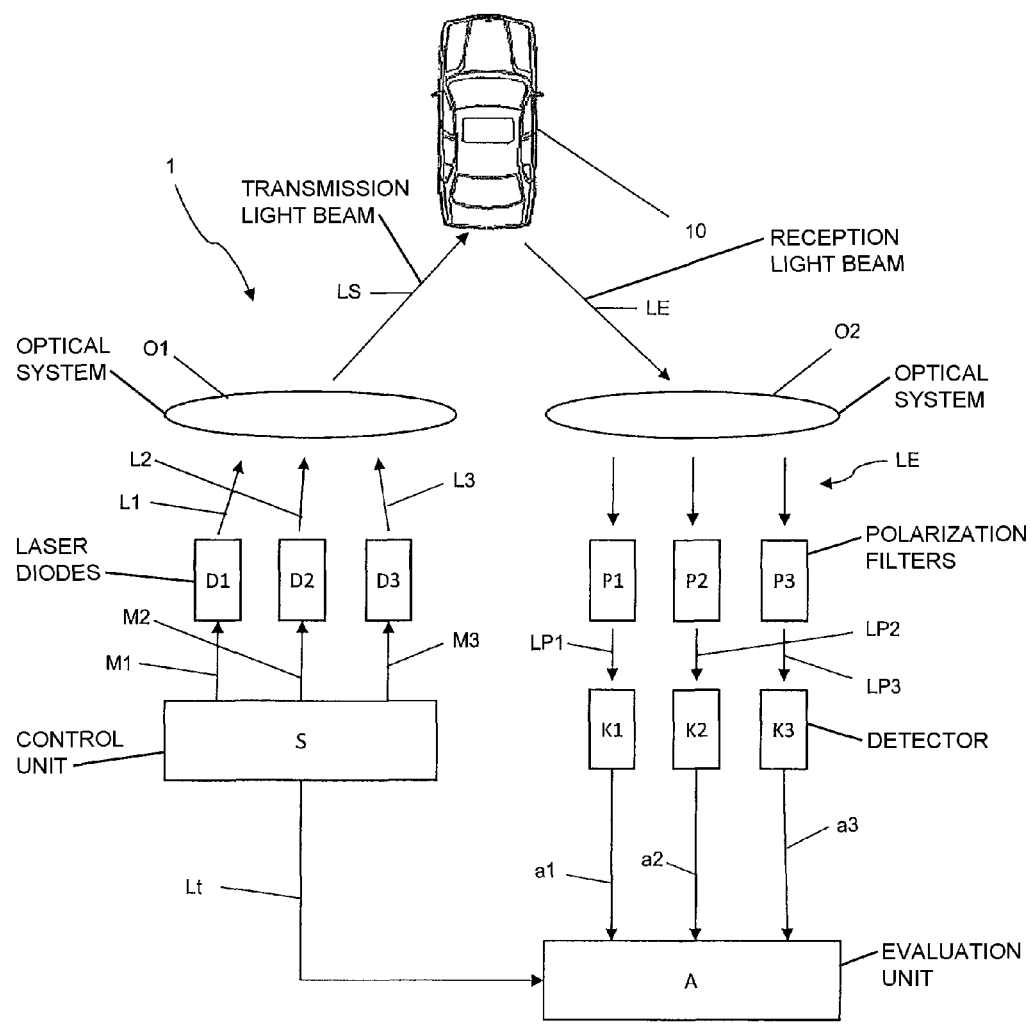
FIG. 1 shows a schematic block diagram of an apparatus for explaining the method according to the invention.

FIG. 1 shows an apparatus 1 of a vehicle for determining a distance to an object 10, which may represent, for example, a preceding vehicle.

Figure 2:
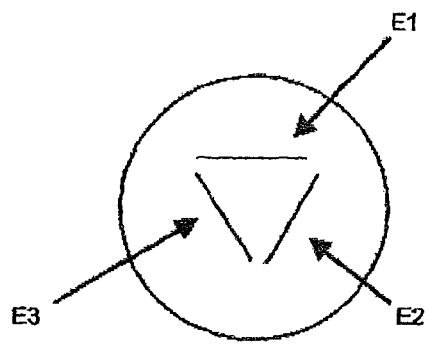
FIG. 2 shows a schematic illustration of the polarization planes of the light sources used in the apparatus according to FIG. 1.

This apparatus 1 comprises three laser diodes D1, D2 and D3, each of which generating a linearly polarized light beam L1, L2, L3. These three laser diodes D1, D2 and D3 are arranged such that their polarization planes E1, E2 and E3 are each offset by 120° to each other, as is schematically shown in FIG. 2. Thus, the polarization plane E2 of the laser diode D2 is shifted with respect to the polarization plane E1 of the laser diode D1 by 120° and the polarization plane E3 of the laser diode D3 by a further 120°.

Figure 3:
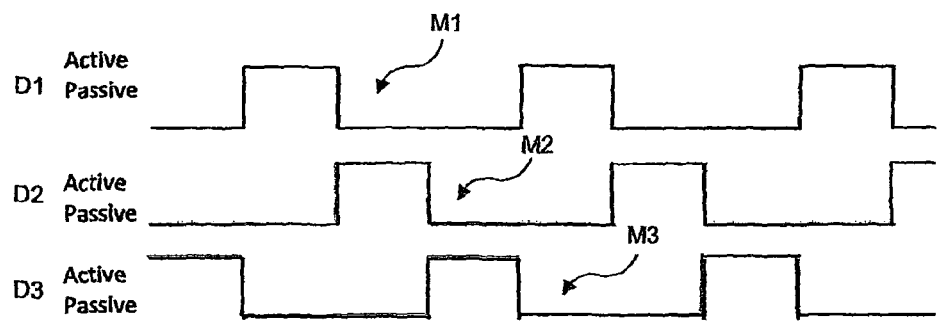
FIG. 3 shows a mark-space pattern for controlling the light sources used in the apparatus according to FIG. 1.

Each of these three laser diodes D1, D2 and D3 is controlled by a mark-space pattern, wherein these three mark-space patterns M1, M2 and M3 are generated by a control unit S and are fed to these laser diodes D1, D2 and D3. A first mark-space pattern is shown in FIG. 3, wherein for all three laser diodes D1, D2 and D3 an identical pattern is used, which are, however, phase-shifted in such manner that of these three laser diodes D1, D2 and D3 at a point in time only one laser diode is active in each case. These three mark-space patterns M1, M2 and M3 thus are disjunctively phase-shifted.

The three light beams L1, L2 and L3 of the laser diodes D1, D2 and D3 are collected by an optical system O1 and are superimposed to form a transmission light beam LS, which is now polarized-modulated. This light beam LS thus comprises the three polarization planes E1, E2 and E3, which alternate according to the light pulses of the light beams L1, L2 and L3.

The transmission light beam LS is reflected at the object 10 and is fed as reception light beam LE to a second optical system O2 of the apparatus 1.

The reception light beam LE parallelized by the optical system O2 is directed onto a polarization analyzer, which comprises polarization filters P1, P2 and P3. The polarization direction of the polarization filter P1 is aligned or adapted to the polarization plane E1 of the laser diode D1, the polarization direction of the polarization filter P2 is aligned or adapted to the polarization plane E2 of the laser diode and the polarization direction of the polarization filter P3 is aligned or adapted to the polarization plane E3 of the laser diode D3. Since the polarization planes E1, E2 and E3 are slightly rotated during the reflection at the object 10, this rotation is taken into account, for example, in the arrangement of the laser diodes D1, D2 and D3 or in the arrangement of the polarization filters P1, P2 and P3. The polarization direction of the polarization filter P1, P2 or P3 thus coincides with the polarization plane E1, E2 or E3 of the laser diode D1, D2 or D3 respectively, which means that here minor deviations or minor distortions are taken into account, which may occur due to reflections at the object 10 or by way of construction due to manufacturing tolerances.

The light LP1, LP2 and LP3 generated by the polarization filters P1, P2 and P3 is in each case fed to a detector K1, K2 and K3, which thereof produce signals a1, a2 and a3, which are fed to an evaluation unit A.

By comparing these signals with the control signals of the control unit S controlling the laser diodes D1, D2 and D3, which control signals include the mark-space patterns M1, M2 and M3 and are also fed to the evaluation unit A via a line Lt, the distance of the object 10 is determined by means of this evaluation unit A based on the temporal phase shift between these signals.

Figure 4:
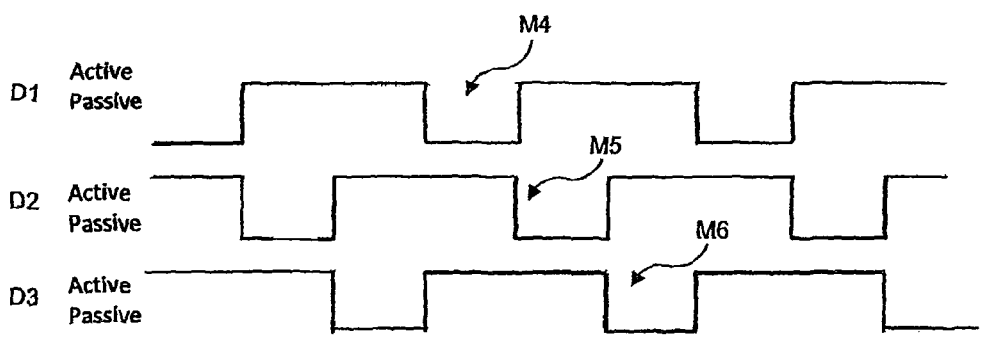
FIG. 4 shows a further mark-space pattern for controlling the light sources used in the apparatus according to FIG. 1.

Instead of the mark-space patterns M1, M2 and M3 according to FIG. 3 also a mark-space pattern M4, M5 and M6 according to FIG. 4 can be used, which also represent an identical mark-space pattern, however, are phase-shifted to form the individual mark-space patterns M4, M5 and M6, so that the light pulses of two respective laser diodes D1 and D2 or D1 and D3 or D2 and D3 are partially superimposed at the same time.

Therefore, the transmission light beam LS formed by these three light beams L1, L2 and L3 comprises in addition to the polarization planes E1, E2 and E3 additionally a further polarization plane generated by two superimposed light beams L1 and L2, or L1 and L3 or L2 and L3, respectively.

This makes it possible that the existing polarizing filters P1, P2 and P3 are adjusted to these aforementioned newly created polarization planes or that in addition to the polarization filters P1, P2 and P3, further polarization filters adjusted to these newly created polarization planes are used.

The mark-space patterns shown in FIGS. 2 and 3 show a PWM-pattern, the laser diodes D1, D2 and D3 are therefore controlled pulse-width modulated. Likewise, controlling by means of a PPM-pattern is possible. In addition to a mark-space pattern with a constant frame also a mark-space pattern with a non-constant frame can be used.

In the embodiments described above, light beams L1, L2 and L3 with linearly polarized light are used. As another variation, a "clockwise" or "counterclockwise" and/or "rotation direction changing" modulation method is possible. For this purpose, light sources with circularly and/or elliptically polarized light beams are used.

Finally, with respect to the mark-space patterns it is also possible to use variations in each case with a weighted distribution of the individual polarization planes.

Further, in the embodiments described above, laser diodes are used, which already produce linearly polarized light. It is also possible to use light sources with non-polarized, but monochromatic light and to polarize this light linearly or circularly or elliptically with downstream polarizers. Finally, it is alternatively also possible to adjust the desired polarization direction via an electric field by means of a so called Pockels cell.

In the embodiment described above, three light sources D1, D2 and D3 are used, which form the transmission light beam LS. A particularly simple construction of this apparatus 1 is obtained, if instead of the three light sources only two light sources are used, for example, two laser diodes with two polarization planes shifted by 90°.

The invention claimed is:

1. A method of determining a distance of an object, comprising:
   generating a polarization-modulated transmission light beam by at least two light sources which respectively emit differently polarized light beams that are included in the transmission light beam, wherein the light sources are each operated respectively with a respective defined mark-space pattern,
   receiving, with a polarization analyzer, a reception light beam caused as a reflection of the transmission light beam from the object, wherein the polarization analyzer is embodied with a number of polarization filters corresponding at least to a number of the light sources, and wherein a polarization plane of each one of said polarization filters is respectively correspondingly adapted to a respective polarization plane of the respective light beams, and
   feeding an output signal of the polarization analyzer to an evaluation unit which determines the distance of the object depending on the output signal.

2. The method according to claim 1, characterized in that the light sources are operated with disjunctively phase-shifted mark-space patterns.

3. The method according to claim 1, characterized in that at least two of the light sources are operated with non-disjunctively phase-shifted mark-space patterns.

4. The method according to claim 1, characterized in that a PWM-pattern is used as the mark-space pattern.

5. The method according to claim 1, characterized in that a PPM-pattern is used as the mark-space pattern.

6. The method according to claim 1, characterized in that the light beams of the light sources are linearly polarized.

7. The method according to claim 1, characterized in that the light beams of the light sources are circularly or elliptically polarized.

8. The method according to claim 1, characterized in that the at least two light sources include two light sources respectively having polarization planes oriented at an angle of 90° to each other.

9. The method according to claim 1, characterized in that the at least two light sources include three light sources respectively having polarization planes oriented at an angle of 120° to each other.

10. A distance determination method comprising:
generating a polarization-modulated first light beam having a first polarization and a first mark-space pattern;
generating a polarization-modulated second light beam having a second polarization and a second mark-space pattern, wherein said second polarization differs from said first polarization and said second mark-space pattern differs from said first mark-space pattern;
directing said first and second light beams into an environment containing an object;
receiving a reception light beam that is caused by reflection of said first and second light beams from said object;
analyzing said reception light beam with a polarization analyzer having first and second polarization filters, wherein said first polarization filter has a first polarization plane corresponding to said first polarization, and said second polarization filter has a second polarization plane corresponding to said second polarization; and
in an evaluation unit, evaluating an output of said polarization analyzer and determining a distance to said object dependent on said evaluating of said output.

11. The distance determination method according to claim 10, wherein said first mark-space pattern and said second mark-space pattern are disjunctively phase-shifted relative to one another.

12. The distance determination method according to claim 10, wherein said first mark-space pattern and said second mark-space pattern are non-disjunctively phase-shifted relative to one another.

13. The distance determination method according to claim 10, wherein said first and second mark-space patterns are respective PWM-patterns.

14. The distance determination method according to claim 10, wherein said first and second mark-space patterns are respective PPM-patterns.

15. The distance determination method according to claim 10, wherein said first polarization of said first light beam is a first linear polarization, and said second polarization of said second light beam is a second linear polarization.

16. The distance determination method according to claim 10, wherein said first polarization of said first light beam is a first circular or elliptical polarization, and said second polarization of said second light beam is a second circular or elliptical polarization.

17. The distance determination method according to claim 10, wherein said first polarization of said first light beam and said second polarization of said second light beam respectively have polarization planes oriented at an angle of 90° relative to one another.

18. The distance determination method according to claim 10,
further comprising generating a third light beam having a third polarization,
wherein said first polarization of said first light beam, said second polarization of said second light beam, and said third polarization of said third light beam respectively have polarization planes oriented at an angle of 120° relative to one another.

* * * * *